(12) United States Patent
Chateau et al.

(10) Patent No.: US 8,632,647 B2
(45) Date of Patent: Jan. 21, 2014

(54) METHOD OF CONTROLLING TREAD SHRINKAGE DURING CURING

(75) Inventors: Jean-Jacques Chateau, Piedmont, SC (US); Henry Schmitt, Townville, SC (US); Robert Young, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 846 days.

(21) Appl. No.: 12/199,299

(22) Filed: Aug. 27, 2008

(65) Prior Publication Data
US 2010/0051175 A1   Mar. 4, 2010

(51) Int. Cl.
B29C 73/00 (2006.01)

(52) U.S. Cl.
USPC .......................................................... 156/96

(58) Field of Classification Search
USPC .......................................................... 156/96
See application file for complete search history.

(56) References Cited

U.S. PATENT DOCUMENTS

| | | | |
|---|---|---|---|
| 3,236,709 A | 2/1966 | Carver | |
| 3,325,326 A | 6/1967 | Schelkmann | |
| 4,269,644 A | 5/1981 | Goldstein | |
| 4,434,018 A | 2/1984 | Brewer | |
| 4,620,561 A | 11/1986 | Brewer | |
| 5,055,148 A | 10/1991 | Lindsay | |
| 5,151,148 A | 9/1992 | Lindsay et al. | |
| 6,145,535 A | 11/2000 | Louchart, III | |
| 6,368,439 B1 | 4/2002 | Bender et al. | |
| 2008/0084002 A1 | 4/2008 | Raben | |
| 2010/0051175 A1 | 3/2010 | Chateau et al. | |

FOREIGN PATENT DOCUMENTS

| | | |
|---|---|---|
| DE | 32 19 107 | 11/1983 |
| EP | 075 288 | 3/1983 |
| EP | 0075288 A | 8/1983 |
| EP | 0399942 A1 | 11/1990 |
| EP | 0730950 A3 | 4/1997 |
| GB | 1085801 | 10/1967 |
| JP | S58134728 A | 8/1983 |
| JP | 01095009 A | 4/1989 |
| JP | H02150229 U | 12/1990 |
| RU | 2165357 C2 | 4/2011 |

OTHER PUBLICATIONS

PCT/US2009/055072 International Search Report, Form PCT/ISA/210.
PCT/US2009/055072 International Written Opinion, Form PCT/ISA/237.
PCT/US2010/038613 International Search Report, Form PCT/ISA/220.
PCT/US2010/038613 Written Opinion, Form PCT/ISA/237.

*Primary Examiner* — Yogendra Gupta
*Assistant Examiner* — John Robitaille
(74) *Attorney, Agent, or Firm* — Hahn Loeser & Parks LLP

(57) ABSTRACT

In particular embodiments, a method of forming a retreaded tire includes the steps of: applying a tread to a tread-engaging portion of a tire carcass, the tread having an initial width and a layer of cushion gum interposed between the tread and tire carcass; placing a curing membrane about the tread to form a tire curing assembly having a compartment between the membrane and tread; placing the tire curing assembly in a vessel chamber; pressurizing the chamber to a predetermined pressure; heating the chamber to a predetermined temperature; pressurizing the compartment to a pressure greater than 14.7 psia and less than the chamber pressure to provide a pressure differential, the step initializing after the step of pressurizing the chamber initializes and whereby a final tread width is provided that is equal to 98.0% or more of the initial tread width when the initial tread width is approximately 290-500 mm.

30 Claims, 3 Drawing Sheets

METHOD OF CONTROLLING TREAD SHRINKAGE DURING CURING

BACKGROUND OF THE INVENTION

1. Field of the Invention

This invention relates generally to the curing of retreads upon tire carcasses, and more specifically, to controlling the shrinkage of retreads during the tire curing process.

2. Description of the Related Art

It is commonly known to form a retreaded tire by attaching a pre-cured tread to a tire carcass. The tread is typically pre-formed into a strip having a tread pattern, and is later applied about the circumference of a prepared tire carcass. The tire carcass is typically buffed substantially free of the old tread, and a layer of cushion gum or liaison rubber is applied to the buffed tread area prior to receiving the new tread.

Once the retreaded tire is assembled, a flexible curing membrane is placed about the tire to retain the tread in proper position relative to the tire carcass. The membrane-laden retreaded tire is then placed into a pressure chamber within a curing vessel, such as an autoclave, to cure the tread to the tire carcass. When the curing cycle begins, substantially all of the air contained within a compartment formed between the tire and the membrane has been removed by a vacuum source. Accordingly, the flexible membrane is forced against the tread and tire carcass. This compartment is maintained in a substantially pressure-less state for a significant amount of time, such as 15-20 minutes, during which the vessel chamber is heated and pressurized. After the 15-20 minutes expires, the compartment is pressurized to a desired pressure to counter-act the chamber pressure. Subsequently, the cure is completed within the vessel. Once the retreated tire is cured, the tread width is substantially reduced, at times by 3-4% of the original width. On narrower vehicle tires, such as 225-260 millimeters (mm) nominally wide tires, shrinkage may be at least 3-4 mm, while on wider tires, such as 390 mm nominally wide tires, shrinkage may surpass 14 mm.

Tread width shrinkage is not desired for numerous reasons. For example, shrinkage forms irregular tread elements, such as tread blocks, which detrimentally affects tread wear and tire uniformity. Also, narrower treads reduce the contact patch of a tire, and therefore, reduce grip and increase wear. Further, tread voids, such as tread grooves, are reduced to detrimentally affect wet tire performance. Accordingly, it is desirous to provide a method of curing the retreaded tire while significantly reducing the tread width shrinkage in the cured retreaded tire.

SUMMARY OF THE INVENTION

Particular embodiments of the present invention include methods of forming a retreaded tire. Particular embodiments of such methods includes the steps of applying a substantially pre-cured rubber tread to a tread-engaging portion of a tire carcass, wherein the tread has an initial width and a layer of cushion gum interposed between the tread and the tire carcass. Additional steps include covering at least the tread with a flexible curing membrane to form a tire curing assembly having a pressurization compartment interposed at least between the membrane and the tread, and placing the tire curing assembly within a chamber of a curing vessel. Other steps include pressurizing the chamber to a predetermined chamber pressure and heating the chamber to a predetermined temperature. Such methods may include the step of pressurizing the compartment to a predetermined compartment pressure greater than 14.7 psia and less than the chamber pressure to provide a pressure differential, the step initializing after the step of pressurizing the chamber is initialized and whereby a final tread width is provided that is equal to or greater than 98.0% of the initial tread width when the initial tread width is approximately 290-500 mm.

Particular embodiments of the present invention include a method of forming a retread tire, such method including the step of placing a tread having an initial width upon a tire carcass having sidewalls, wherein cushion gum is interposed between the tread and carcass. Such method may also include covering at least the tread with a curing membrane to form a tire curing assembly and a pressurization compartment at least between the tread and membrane, and placing the tire curing assembly within a chamber of a curing vessel. Still further steps may include pressurizing the chamber to a predetermined chamber pressure, and heating the chamber to a predetermined temperature. Particular embodiments may also include the step of pressurizing the compartment to a predetermined compartment pressure less than the chamber pressure, the step initializing after the step of pressurizing the chamber is initialized to provide a pressure differential, and in approximately 7 minutes or less after either the step of pressurizing the chamber or the step of heating the chamber initializes to provide a final tread width.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Particular embodiments of the present invention provide methods for curing a tread to a tire carcass to form a retreaded tire. As further described below, the inventors have discovered that, according to a particular curing law, by releasing the vacuum on the curing envelope at an early enough time during the curing process, the tread bonded to the tire carcass does not have a significantly less width than the width before curing. If the vacuum is not released early enough, then the tread bonded to the tire carcass does have a significantly less width than the width before curing.

Particular embodiments of the methods may include applying a substantially pre-cured rubber tread to a tread-engaging portion of a tire carcass having a pair of sidewalls, wherein the tread has an initial width and a layer of cushion gum interposed between the tread and the tire carcass. The operation of retreading generally comprises placing a new, substantially pre-cured tread on a used tire carcass. Accordingly, the used tire is prepared for retreading by at least buffing a portion of the tread from the used tire to provide a tire carcass. Subsequently, liaison rubber, also known as cushion gum, is placed on the tread area of the carcass. The cushion gum is used to attach the new tread to the tire carcass, and must be cured to properly secure the tread to the tire carcass.

Figure 1:
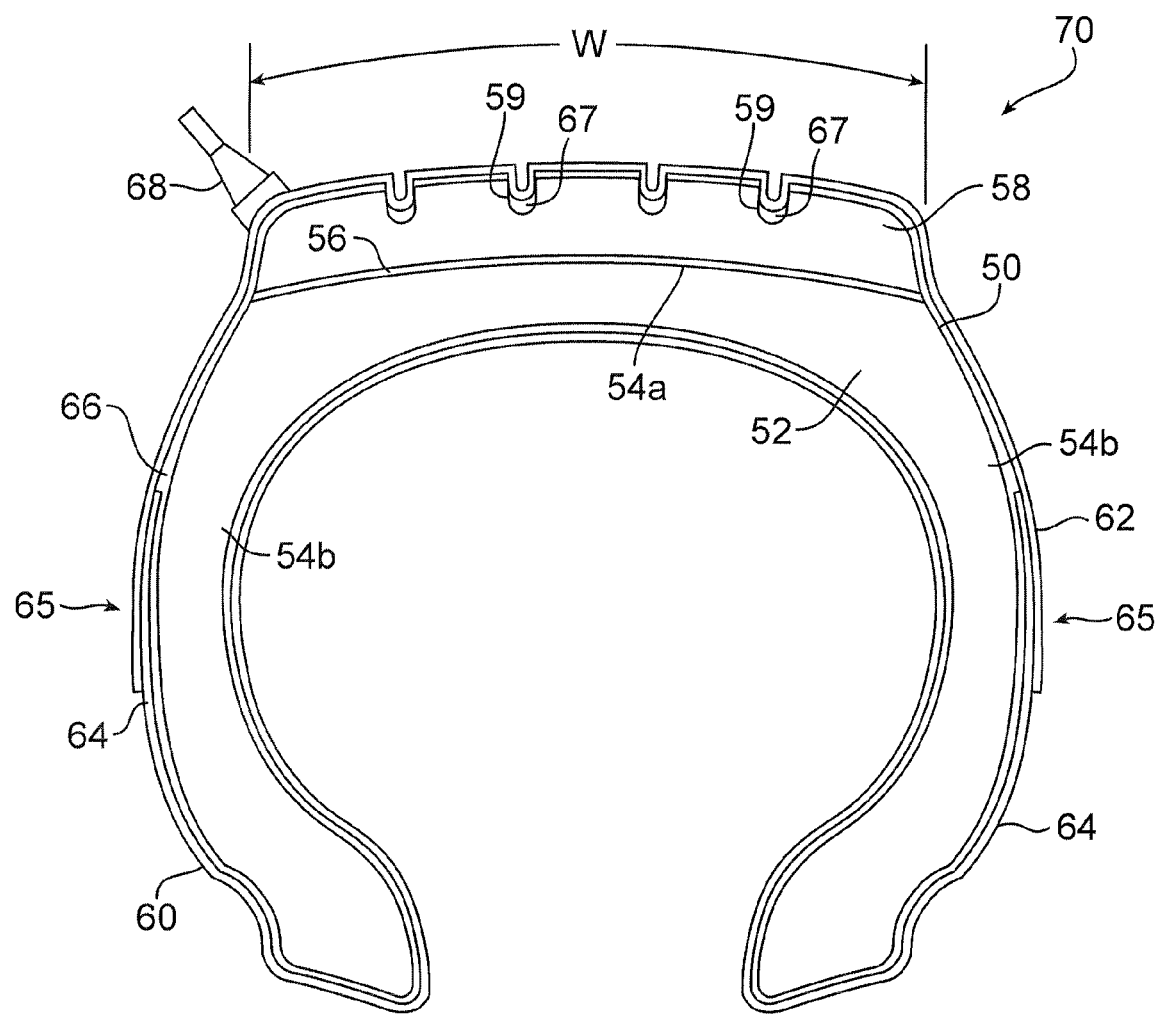
FIG. 1 is a partial cross-sectional view of a retreaded tire encapsulated within a curing membrane, in accordance with an embodiment of the invention.

With reference to FIG. 1, an exemplary retreaded tire assembly 50 is shown encapsulated within an exemplary curing membrane 60. The tire assembly 50 includes a tire carcass 52 having a tread area 54a and a pair of sidewalls 54b. The new tread 58 is placed atop cushion gum 56 positioned along tread area 54a of tire carcass 52. Tread 58 has an initial width W prior to initialization of the curing process, and the curing of cushion gum 56. Tread width W, whether measured before or after the curing of tire assembly 50, is measured laterally (i.e., side-to-side and normal to the tread centerline) along the arcuate tread contact surface when the tread is mounted on tire carcass 52, as shown in FIG. 1. While the methods discussed herein may be used with any width tread, in particular embodiments, the methods are used to cure and form vehicle tires having initial widths W of 600 millimeters (mm) or less. In particular embodiments, the initial widths W are approximately 500 mm or less, and in other embodiments, between 290 and 500 mm, and in still other embodiments, less than 290 mm. In still other embodiments, the methods may be used with heavy vehicle/equipment tires, such as for earthmovers, dump trucks, and aircraft, each of which may have initial tread widths upwards of, or even surpassing, 1400 mm. A variety of cushion gum compositions may be used, as the desired composition may be dependent upon the tread composition and the composition of the adjacent tire carcass surface (i.e., the tread area) to which the cushion gum is applied. To achieve proper attachment, a retread curing process cures the cushion gum while the tire assembly is positioned within a curing vessel, or autoclave. In particular embodiments, the cushion gum is approximately 1 to 2.5 mm thick. It is contemplated that thicker or thinner cushion gum may be used.

Such methods also include the steps of covering the tread with a flexible curing membrane to form a tire curing assembly having a pressurization compartment interposed at least between the membrane and the tread of the tire, and placing the tire curing assembly in a chamber of a curing vessel. Before initializing the inventive curing process within the vessel, the tire is enclosed in a curing membrane to form a pressurization compartment at least about the tread of the tire. The membrane maintains proper alignment of the new tread relative to the tire carcass. The membrane also facilitates a pressure differential between the membrane compartment (and the sealed tire assembly) and the vessel chamber. There are a variety of alternative curing membranes used in the art, and any curing membrane may be used to practice the inventive methods described herein, as the present invention provides an improvement to the curing cycle parameters by controlling the pressurization and/or temperatures of the curing cycle.

In the embodiment shown in FIG. 1, an exemplary membrane 60 surrounds tire assembly 50 to form a tire curing assembly 70, and comprises a first envelope 62 and a second envelop 64, each of which overlap the other at locations 65 to form a seal when a pressure differential exists between vessel chamber 12 and compartment 66. The membrane is generally flexible, which allows the membrane to collapse about the tread and/or tire when the membrane is connected to a vacuum source, and a substantial amount of air is removed from the membrane compartment to provide a compartment that is under at least partial vacuum, and in particular embodiments, a compartment having a pressure substantially equal to zero psia. A partial vacuum, in particular embodiments, provides a compartment pressure less than 14.7 psia, less than 10 psia, less than 8 psia, less than 5 psia, or less than 3 psia.

For example, pockets of air 67 may remain at the bottom of tread grooves 59. In particular embodiments, substantially equal to zero psia provides upwards of 3.5-4.0 psia of pressure. By collapsing, the membrane maintains the tread in proper position relative to the tire carcass. Further, when the chamber is pressurized while the membrane and/or compartment is under vacuum, the pressure from the chamber is transferred through the portions of the membrane to the portions of the tread and tire carcass contacting the membrane. Other embodiments of membrane 60 known in the art include, for example, a rim on which a tire carcass is mounted. An envelope, similar to first envelope 62, extends down the tire carcass sidewalls to engage the rim for the purpose of forming a pressure compartment along the tread and sidewalls. A second compartment is then formed by a second envelope placed between the inside of the tire carcass and the rim, the second envelope forming a second pressure compartment for substantially occupying the void between the rim and the inner surface of the tire carcass. This second compartment would operate under vacuum and/or under pressure as desired.

The retread curing process is performed generally within a curing vessel, such as, for example, an autoclave. The curing vessel generally provides a chamber in which the membrane-laden tire assembly is placed for curing. Generally during the curing process, the chamber is pressurized to a desired pressure and heated to a desired temperature. One or more tire curing assemblies may be placed into the curing vessel for curing. Means is also provided to control the pressures and temperatures within the chamber and/or compartment formed by the membrane and tire assembly. While any curing vessel known in the art may be used to practice the present invention, an exemplary curing vessel is discussed in more detail below in connection with the present invention.

Particular embodiments of such methods may include the step of pressurizing the chamber to a predetermined chamber pressure. In particular embodiments, the step of pressurizing the chamber initializes while the compartment is under at least a partial vacuum, e.g., less than 14.7 psia, less than 10 psia, less than 8 psia, less than 5 psia or less than 3 psia. In particular embodiments, after the tire curing assembly is placed within the curing vessel, the compartment formed by the membrane may placed in communication with a vacuum source, to at least place the compartment under partial vacuum, and in particular embodiment, to place the compartment at a pressure substantially equal to zero psia. When under at least partial vacuum, the membrane maintains the tread in proper alignment relative to the tire carcass, and promotes heat transfer from the chamber to the tire assembly. It also facilitates the transfer of pressure from the chamber to the tread and tire carcass along portions of the membrane that are in contact with such portions of the tread and tire carcass. In particular embodiments, the compartment is maintained under vacuum prior to being placed into the vessel.

In particular embodiments, the chamber is pressurized to a predetermined pressure of approximately 85 to 105 psia. In other embodiments, the predetermine pressure is approximately 90 to 100 psia. Pressurization of the chamber to a predetermine pressure may occur over a short, or approximately instantaneous, period of time, or over an extended time period. Accordingly, one or more flow restrictors, or any other flow control means known in the art, to control the flow of fluid into the chamber, and/or the compartment, and, therefore, the rate of pressurization within the chamber and/or compartment. In particular embodiments, the chamber pressurization period endures for a period approximately between 15 and 25 minutes until reaching the desired pressure. In more particular embodiments, the pressurization period endures for approximately 18-22 minutes. It is contemplated that pressurization may occur for time periods less than 15 minutes, and over 25 minutes. For example, the pressurization may occur over a period of 10 to 60 minutes in other embodiments.

Figure 3:
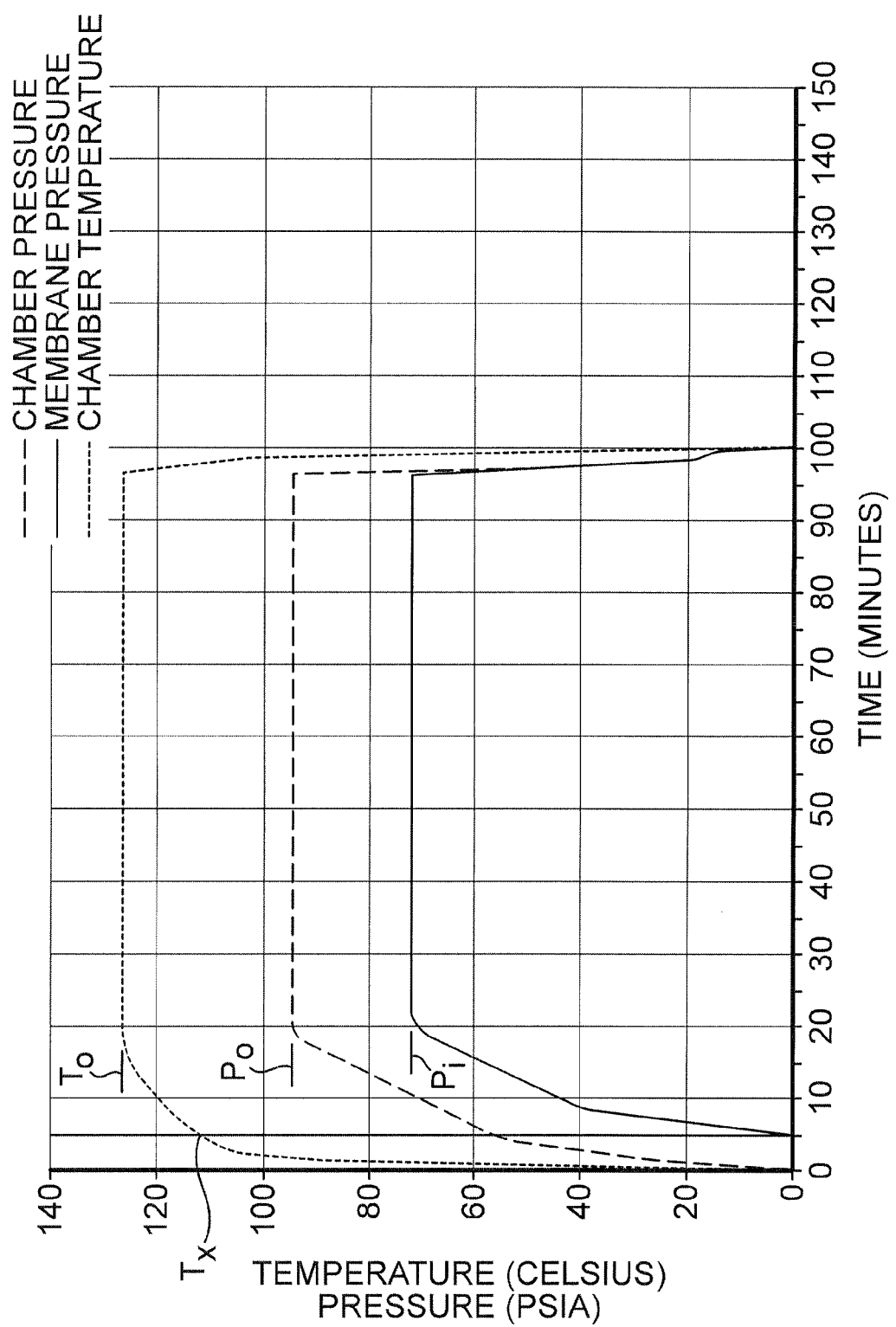
FIG. 3 is a diagram showing curing parameters for a curing law (i.e., cycle) for retreaded tires, in accordance with an embodiment of the present invention.

With reference to FIG. 3, a graph describes an exemplary curing law (i.e., curing cycle) providing various cure parameters, such as pressures and temperatures, according to one embodiment of the present invention. More specifically, the graph shows chamber pressures and temperatures and compartment pressures, with reference to time. Accordingly, FIG. 3 provides, in a particular embodiment, the chamber pressure being pressurized to a predetermined pressure $P_o$ in approximately 20-22 minutes. After attaining the predetermined pressure $P_o$, the pressure may be maintained within a tolerance, or may intentionally fluctuate at different stages of the curing process. In particular embodiments, pressurization of the chamber is initiated when the membrane and/or compartment is under vacuum.

Particular embodiments of such methods may include the step of heating the chamber to a predetermined temperature. Generally, to cure the cushion gum and thereby affix the tread to the tire carcass, the cushion gum is exposed to a predetermined curing temperature $T_o$ for a period of time. In particular embodiments, the predetermined curing temperature $T_o$ is approximately 95 to 137 degrees Celsius. This may be achieved in 15 to 25 minutes. In other embodiments, the predetermined curing temperature $T_o$ is approximately 120 to 135 degrees Celsius. In the embodiment shown in FIG. 3, which shows a particular curing law providing particular curing temperatures and pressures, the curing temperature is approximately 127 degrees Celsius, but may operate at a temperature of 117 to 137 degrees Celsius, in other embodiments. The thickness of the cushion gum may also affect the curing period, whereby thicker cushion gum may require more curing time.

In particular embodiments, such as is shown in the embodiment of FIG. 3, the chamber temperature increases to a predetermined curing temperature $T_o$ over a period of 15 to 25 minutes. In particular embodiments, the temperature $T_o$ is achieved in approximately 20-22 minutes. In particular embodiments, an extended cure may be provided that provides a predetermined curing temperature $T_o$ of approximately 95-100 degrees Celsius, which is reached at approximately 15 minutes. However, the period of heating the chamber to a predetermined temperature may occur over a shorter or longer period of time, which may be less than 15 minutes and greater than 25 minutes.

The curing period of the tire at the curing temperature $T_o$ may extend for a desired period of time for the purpose of curing the tire assembly (i.e., the tread, cushion gum, and tire carcass). For example, in the one embodiment described in FIG. 3, the tire is exposed to the curing temperature $T_o$ for approximately 76-77 minutes. After attaining the desired temperature $T_o$, the temperature may be maintained within a tolerance, or may intentionally fluctuate at desired instances or intervals during the curing process. Because curing parameters are impart a function of the cushion gum being used, it is contemplated that other curing parameters, such as the curing temperature $T_o$ and the curing period may vary with the use of different cushion gum formulas.

Particular embodiments of such methods may include the step of pressurizing the compartment to a predetermined compartment pressure. In particular embodiments, the step of pressurizing the compartment pressurizes to a pressure greater than 14.7 psia and less than the chamber pressure to provide a pressure differential. In particular embodiments, the step of pressurizing the compartment initializes after the step of pressurizing the chamber is initiated to provide a pressure differential between the chamber and the compartment. By providing a pressure differential, at least a portion of the tread and/or tire carcass is insulated from the greater chamber pressure. In particular embodiments, the predetermined compartment pressure $P_i$ is less than $P_o$. In particular embodiments, predetermined compartment pressure $P_i$ is 75 psia or less. In other embodiments, compartment pressure $P_i$ is 60 to 75 psia. In an effort to minimize the tread and/or tire carcass's exposure to the chamber pressure through contact with the membrane, in particular embodiments, pressurization of the compartment is initiated in approximately 7 minutes or less after pressurization of the chamber is initialized. In other embodiments, pressurization of the compartment is initiated within 6 minutes after pressurization of the chamber is initialized. In yet other embodiments, pressurization of the compartment is initiated within 5 minutes after pressurization of the chamber is initialized. In other embodiments, the step of pressurizing the compartment initializes when the chamber temperature is approximately 120 degrees Celsius or less. In FIG. 3, this temperature is identified as $T_x$, which, in the embodiment shown, is less than $T_o$. It is contemplated, in other embodiments, that $T_x$ may be substantially equal to $T_o$. In other embodiments, the step of pressurizing the compartment initializes before the chamber is heated to the predetermined temperature $T_o$. This may reduce the amount of thermal heat that the tread is exposed under particular pressures over particular over periods of time, which may assist in reducing tread shrinkage.

Particular embodiments of such methods include a pressure differential between the chamber pressure and the compartment pressure is provided, the chamber pressure being greater than the compartment pressure. In one embodiment, the pressure differential ($P_o - P_i$) is approximately 10 to 40 psi. In yet other embodiments, the pressure differential is 11.7 to 37 psi. In still another embodiment, the pressure differential is approximately is 26 to 29 psi. It is contemplated that the pressure differential may be achieved within a particular duration. Accordingly, in particular embodiments, the pressure differential is achieved in approximately 7 minutes or less after the step of pressurizing the compartment initializes, and in other embodiment, the pressure differential is reached in 6 minutes or less. In a particular embodiment, the step of pressurizing the compartment initializing when the chamber temperature is approximately 120 degrees Celsius or less and in approximately 7 minutes or less after either the step of pressurizing the chamber or the step of heating the chamber initializes.

Figure 2:
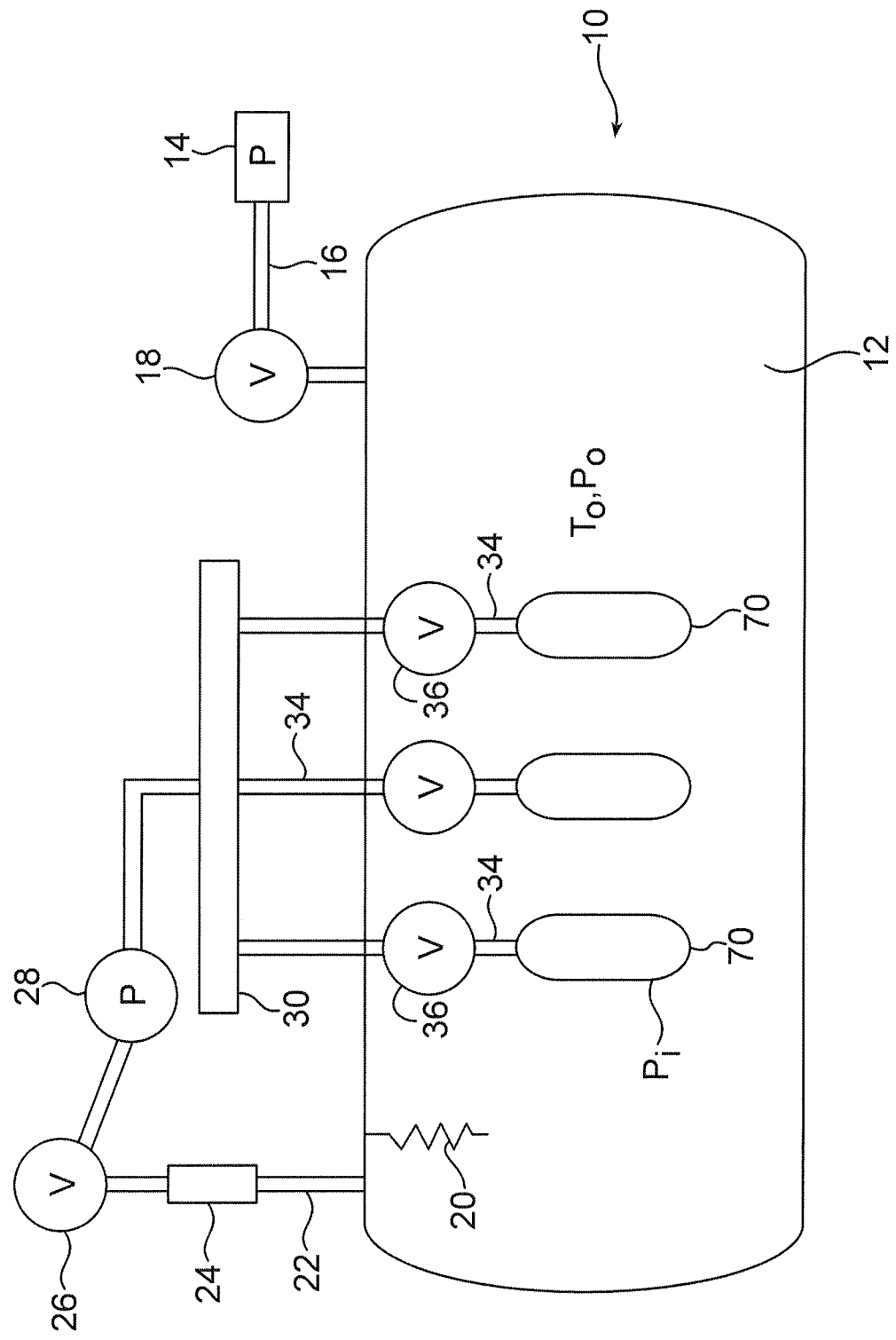
FIG. 2 is a schematic view of a retreading system for use in curing retreaded tires, in accordance with an embodiment of the present invention.

The methods discussed above, in an exemplary embodiment, may be practiced in the curing vessel 10 shown in FIG. 2. Curing vessel 10 is also known as an autoclave. Vessel 10 may accept a plurality of tires; however, it is contemplated that vessels 10 or any other known curing device may be used to practice the methods disclosed herein.

As shown in FIG. 2, vessel 10 includes an interior chamber 12, in which membrane-laden retread tire assemblies 50 are provided for a curing. In the embodiment shown, chamber fluid pressure source 14 is provided in association with vessel 10. Source 14 provides fluid pressure to chamber 12. In operation, fluid pressure is transferred from source 14 through line 16 to pressurize chamber 12 to pressure $P_o$. A regulator valve 18 may be placed along line 16 to regulate the pressure supplied from source 14 to achieve the desired pressure $P_o$ in chamber 12. The pressurized fluid may be any desired fluid, such as, for example, air, steam, or water, or any combination thereof. Vessel 10 also includes a heat source 20 for heating chamber 12 to a desired temperature $T_o$.

The pressure in compartment 66 may be controlled by any known means. For example, in the embodiment shown in FIG. 2, compartment 66 is connected to chamber 12, so that when chamber 12 becomes pressurized, the chamber pressure is supplied to compartment 66 by line 22, which extends between the vessel chamber 12 and a tire pressure manifold 30. This is possible since the chamber pressure is greater than the compartment pressure. In other embodiments, for example, the pressure source for compartment 66 may be a source independent of chamber 12, and may instead comprise chamber pressure source 14 or another independent source.

Subsequent its connection to chamber 12, line 22 includes a pressure differential check valve 24. Continuing further toward manifold 30, a pressure reducer valve 26 is placed along line 22. Finally, between reducer valve 26 and manifold 30, a vacuum source 28 is provided. Also connected to manifold 30 is a pressure relief valve 32. Finally, a line 34 extends from manifold 30 to for pressure communication with tire curing assembly 70, which includes a curing membrane 60 enclosing a tire assembly 50, by way of membrane nozzle 68. A valve 36 may be placed along line 22 or along line 34 to control the pressurization of compartment 66. Valve 36 may operate between three positions, namely, it can connect membrane 60 to manifold 30, it can connect membrane 60 to atmosphere, or it can turn off any communication with membrane 60.

In operation, tire assemblies 50 are enclosed by membrane 60. Subsequently, membrane 60 and/or compartment 66 are substantially relieved of air and/or pressure by way of a vacuum to place the membrane in substantial contact with the assembled tire 50. This vacuum process may occur prior to entering the curing vessel 10, or once positioned in vessel 10 and connected to line 34 by operation of vacuum pump 28. Once membrane 50 is substantially under vacuum (as defined above), the chamber pressure and temperature are increased. In the present embodiment, heating occurs by way of element 20 until reaching the desired temperature $T_o$. Note that the vessel 10 may be pre-heated so that vessel 10 may reach desired temperature $T_o$ at a quicker rate. For example, at approximately 7 minutes or less, in one embodiment, the vacuum in membrane 60 and/or compartment 66 is terminated as line 34 is charged with pressurized fluid. In other embodiments, pressurization of membrane 60 and/or compartment 66 begins when differential valve 26 is opened, which may occur when chamber 12 reaches a pressure that provides the desired pressure differential between chamber 12 and membrane 60 and/or compartment 66. The pressurization of compartment continues until reaching a desired pressure, such as 60 to 75 psia, according to one embodiment. Accordingly, relief valve 32 is set to go off at 75 psia. In other embodiments, the pressurization of compartment continues to the extent necessary to maintain a pressure differential between the chamber and the compartment that is 10 to 40 psi. In other embodiments, the pressure differential maintained is 11.7 to 37 psi. In yet another embodiment, the pressure differential maintained is 26 to 29 psi. Other embodiments of the methods discussed above may be employed with the vessel 10 as described herein, or any other curing vessel known to one in the art.

Various tires were cured using the methods described herein and described in FIG. 3, and compared to tires cured according to a control method. The primary difference between the control method and method disclosed herein is that the compartment in the control method was initiated at approximately 20 minutes after pressurization of the chamber initialized. Accordingly, the pressure differential at 20 minutes was approximately 80 psi in the control method. Before and after tires were cured according to each method, the treads were measured laterally along each tread surface. For a particular tire type having a nominal tread width of 390 mm, the average uncured tread width was 387.6 mm. The average cured width for tires cured according to the control method was 373.1 mm, while the average for those cured according to the inventive method was 380.8 mm, which was approximately a 50% improvement over the control method. With regard to a particular tire type having a 240 mm nominal tread width, the average uncured tread width was 235.9 mm. For such tires, the average cured width according to the control method was 227.0 mm, while the average cured width for the inventive method was 232.3 mm, which was approximately a 60% improvement over the control method.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. In a method of controlling the shrinkage of a tread while forming a retreaded tire, which includes the steps of applying a substantially pre-cured rubber tread to a tread-engaging portion of a tire carcass, wherein the tread has an initial width and a layer of cushion gum interposed between the tread and the tire carcass, covering at least the tread with a flexible curing membrane to form a tire curing assembly having a pressurization compartment interposed at least between the membrane and the tread, and placing the tire curing assembly within a chamber of a curing vessel to cure the tread to the tire carcass, the improvement comprising the steps of:

pressurizing the chamber to a predetermined chamber pressure;

heating the chamber to a predetermined temperature;

pressurizing the compartment to a predetermined compartment pressure greater than 14.7 psia and less than the chamber pressure to provide a pressure differential between the chamber and compartment, the step of pressurizing the compartment initializing after the step of pressurizing the chamber is initialized;

bonding the tread to the tire carcass to form a retreaded tire, the tread having a final tread width that is equal to or greater than 98.0% of the initial tread width when the initial tread width is approximately 290-500 mm.

2. A method as in claim 1, wherein the pressure differential is approximately 10-40 psi.

3. A method as in claim 1, wherein the step of pressurizing the chamber initializes while the compartment is pressurized to approximately zero psia.

4. A method as in claim 1, wherein the pressure differential is achieved in approximately 7 minutes or less after the step of pressurizing the compartment initializes.

5. A method as in claim 1, wherein the step of pressurizing the compartment is initialized in approximately 7 minutes or less after the step of pressurizing the chamber initializes and the compartment pressure is maintained at vacuum pressure or at least partial vacuum pressure for 7 minutes or less before the step of pressurizing the compartment initializes.

6. A method as in claim 1, wherein predetermined chamber pressure is approximately 85-105 psia.

7. A method as in claim 1, wherein the predetermined chamber pressure is achieved in substantially 15-25 minutes.

8. A method as in claim 1, wherein the predetermined temperature is approximately 95-137 degrees Celsius and is achieved in approximately 15-25 minutes after the step of pressurizing the chamber is initialized.

9. A method as in claim 1, wherein the step of pressurizing the compartment initializes when the chamber temperature is approximately 120 degrees Celsius or less.

10. A method of controlling the shrinkage of a tread while forming a retread tire, the method comprising the steps of:
placing a tread having an initial width upon a tire carcass having sidewalls, wherein cushion gum is interposed between the tread and carcass;
covering at least the tread with a curing membrane to form a tire curing assembly and a pressurization compartment at least between the tread and membrane;
placing the tire curing assembly within a chamber of a curing vessel; pressurizing the chamber to a predetermined chamber pressure; heating the chamber to a predetermined temperature;
pressurizing the compartment to a predetermined compartment pressure less than the chamber pressure, the step initializing after the step of pressurizing the chamber is initialized to provide a pressure differential between the chamber and compartment and in substantially 7 minutes or less after either the step of pressurizing the chamber or the step of heating the chamber initializes; and,
bonding the tread to the tire carcass to form a retreaded tire, the tread having a final tread width.

11. The method of claim 10, wherein the predetermined temperature is approximately 95-137 degrees Celsius and is achieved in 15-25 minutes.

12. The method of claim 10, wherein the pressure differential is approximately 10-40 psi.

13. The method of claim 10, wherein the pressure differential is reached within substantially 7 minutes after the step of pressurizing the compartment initializes.

14. The method of claim 10, wherein the step of pressurizing the compartment initializes before the chamber is heated to the predetermine temperature.

15. The method of claim 10, wherein predetermined chamber pressure is approximately 85-105 psia.

16. The method of claim 10, wherein the predetermined chamber pressure is achieved in approximately 15-25 minutes.

17. The method of claim 10, wherein the final tread width is equal to or greater than 98.0% of the initial width of the tread when the initial tread width is approximately 600 mm or less.

18. The method of claim 17, wherein the final tread width is equal to or greater than 98.0% of the initial tread width when the initial tread width is approximately 290-500 mm.

19. The method of claim 17, wherein the final tread width is equal to or greater than 98.4% of the initial tread width when the initial tread width is approximately 290 mm or less.

20. In a method of controlling the shrinkage of a tread while forming a retread tire, which includes the steps of applying a substantially pre-cured rubber tread to a tread-engaging portion of a tire carcass, wherein the tread has an initial width and a layer of cushion gum interposed between the tread and the tire carcass, covering at least the tread with a flexible curing membrane to form a tire curing assembly having a pressurization compartment interposed at least between the membrane and the tread, and placing the tire curing assembly within a chamber of a curing vessel to cure the tread to the tire carcass, the improvement comprising the steps of:
pressurizing the chamber to a predetermined chamber pressure;
heating the chamber to a predetermined temperature;
pressurizing the compartment to a predetermined compartment pressure greater than 14.7 psia and less than the chamber pressure to provide a pressure differential between the chamber and compartment, the step initializing after the step of pressurizing the chamber is initialized;
bonding the tread to the tire carcass to form a retreaded tire, the tread having a final tread width that is equal to or greater than 98.4% of the initial tread width when the initial tread width is approximately 290 mm or less.

21. The method of claim 20, wherein the pressure differential is approximately 10-40 psi.

22. The method of claim 20, wherein predetermined chamber pressure is approximately 85-105 psia.

23. The method of claim 20, wherein the step of pressurizing the compartment initializes before the chamber is heated to the predetermine temperature.

24. The method of claim 10, wherein the predetermined compartment pressure is greater than 14.7 psia and the compartment pressure is maintained at vacuum pressure or at least partial vacuum pressure for 7 minutes or less before the step of pressurizing the compartment initializes.

25. The method of claim 24, wherein the compartment pressure is maintained at vacuum pressure or at least partial vacuum pressure for approximately 5-7 minutes before the step of pressurizing the compartment initializes.

26. The method of claim 24, wherein the step of pressurizing the chamber initializes while the compartment is maintained at vacuum pressure or at least partial vacuum pressure.

27. The method of claim 20, wherein the pressure differential is achieved in approximately 7 minutes or less after the step of pressurizing the compartment initializes.

28. The method of claim 20, wherein the step of pressurizing the compartment is initialized in approximately 7 minutes or less after the step of pressurizing the chamber initializes and the compartment pressure is maintained at vacuum pressure or at least partial vacuum pressure for 7 minutes or less before the step of pressurizing the compartment initializes.

29. The method of claim 10, where in the step of pressurizing the compartment, the step initializes in 7 minutes or less after the step of pressurizing the chamber initializes.

30. The method of claim 10, where in the step of pressurizing the compartment, the compartment is pressurized to a predetermined compartment pressure greater than 14.7 psia and less than the chamber pressure to provide a pressure differential between the chamber and compartment, the step of pressurizing the compartment initializing after the step of pressurizing the chamber is initialized.

* * * * *